United States Patent
Yoshikawa et al.

(10) Patent No.: US 9,663,391 B2
(45) Date of Patent: May 30, 2017

(54) LIQUID PROCESSING APPARATUS

(71) Applicant: Panasonic Intellectual Property Management Co., Ltd., Osaka (JP)

(72) Inventors: Naoki Yoshikawa, Osaka (JP); Shuji Nakanishi, Osaka (JP); Yuya Suzuki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/784,164

(22) PCT Filed: Feb. 20, 2014

(86) PCT No.: PCT/JP2014/000873
§ 371 (c)(1),
(2) Date: Oct. 13, 2015

(87) PCT Pub. No.: WO2014/174742
PCT Pub. Date: Oct. 30, 2014

(65) Prior Publication Data
US 2016/0052810 A1    Feb. 25, 2016

(30) Foreign Application Priority Data

Apr. 22, 2013    (JP) .................. 2013-089405

(51) Int. Cl.
*C02F 3/10* (2006.01)
*H01M 8/16* (2006.01)
(Continued)

(52) U.S. Cl.
CPC .............. *C02F 3/101* (2013.01); *C02F 3/005* (2013.01); *H01M 8/16* (2013.01); *C02F 3/2806* (2013.01);
(Continued)

(58) Field of Classification Search
CPC  C02F 3/101; C02F 3/005; C02F 2201/46105; C02F 2303/06;
(Continued)

(56) References Cited

U.S. PATENT DOCUMENTS

| 4,690,741 A | 9/1987 | Walsh, III et al. |
| 2003/0138674 A1 | 7/2003 | Zeikus et al. |

(Continued)

FOREIGN PATENT DOCUMENTS

| CN | 102001729 A | 4/2011 |
| JP | 01-047494 A | 2/1989 |

(Continued)

OTHER PUBLICATIONS

Extended European Search Report for corresponding European Application No. 14787631.2 dated Apr. 12, 2016.
(Continued)

*Primary Examiner* — Walter D Griffin
*Assistant Examiner* — Cameron Allen
(74) *Attorney, Agent, or Firm* — Renner, Otto, Boisselle & Sklar, LLP

(57) ABSTRACT

A liquid treatment device (100) including: a structure (10) having a first surface (10a) and a second surface (10b), the structure including: a conductor (11) arranged between the first surface (10a) and the second surface (10b), the conductor including a first portion (11a) exposed to outside at the first surface (10a) and a second portion (11b) exposed to outside at the second surface (10b), and the conductor electrically connecting the first portion (11a) and the second portion (11b); and an ion transfer layer (15) arranged between the first surface (10a) and the second surface (10b), the ion transfer layer (15) arranged between the first surface (10a) and the second surface (10b), allowing hydrogen ions to move therethrough; and a first treatment tank (12) for
(Continued)

holding a first liquid to be treated (17) therein, wherein the first surface (10a) of the structure (10) is located inside the first treatment tank (12).

20 Claims, 4 Drawing Sheets

(51) Int. Cl.
*C02F 3/00* (2006.01)
*C02F 3/28* (2006.01)
*C02F 1/461* (2006.01)
*C02F 101/16* (2006.01)

(52) U.S. Cl.
CPC ............ *C02F 2001/46157* (2013.01); *C02F 2001/46161* (2013.01); *C02F 2101/16* (2013.01); *C02F 2201/46105* (2013.01); *C02F 2201/46115* (2013.01); *C02F 2303/06* (2013.01); *Y02E 60/527* (2013.01)

(58) Field of Classification Search
CPC .......... C02F 2201/46115; C02F 3/2806; C02F 2001/46157; C02F 2001/46161; C02F 2101/16; C02F 3/10; C02F 3/00; H01M 8/16; Y02E 60/527
See application file for complete search history.

(56) References Cited

U.S. PATENT DOCUMENTS

| | | |
|---|---|---|
| 2008/0286624 A1 | 11/2008 | Lovley et al. |
| 2012/0003504 A1 | 1/2012 | Yamazawa et al. |
| 2013/0157155 A1* | 6/2013 | Park .................... H01M 8/184 429/417 |
| 2014/0024102 A1 | 1/2014 | Sakai et al. |

FOREIGN PATENT DOCUMENTS

| | | |
|---|---|---|
| JP | 02-071896 A | 3/1990 |
| JP | 2002-520032 A | 7/2002 |
| JP | 2006-159112 A | 6/2006 |
| JP | 2008-288198 A | 11/2008 |
| JP | 2009-093861 A | 4/2009 |
| JP | 2011-065875 A | 3/2011 |
| JP | 2013-239292 A | 11/2013 |
| WO | WO 2010/044145 A | 4/2010 |
| WO | WO 2012/115278 A1 | 8/2012 |

OTHER PUBLICATIONS

International Search Report for corresponding International Application No. PCT/JP2014/000873 mailed Apr. 22, 2014.
International Preliminary Report on Patentability for corresponding International Application No. PCT/JP2014/000873 dated Oct. 28, 2014.

* cited by examiner

LIQUID PROCESSING APPARATUS

TECHNICAL FIELD

The present disclosure relates to a liquid treatment device and a liquid treatment unit.

BACKGROUND ART

Known methods for treating wastewater containing an organic matter include the activated sludge method utilizing the aerobic respiration of microorganisms (e.g., Patent Document No. 1), and the anaerobic treatment method utilizing the anaerobic respiration of microorganisms (e.g., Patent Document No. 2).

In the activated sludge method, a sludge containing microorganisms (activated sludge) and wastewater are mixed together in a biological reactor tank (aeration tank), and the mixture is stirred while sending, into the biological reactor tank, an air needed for microorganisms to oxidatively decompose the organic matter in the wastewater. Thus, the organic matter in the wastewater is subjected to an oxidative decomposition treatment. However, the activated sludge method has a problem in that the aeration of the biological reactor tank requires a very large amount of electric power, and a large amount of sludge (dead microorganisms), which is an industrial waste, is generated as a result of the microorganisms actively metabolizing while breathing oxygen.

In contrast, in the anaerobic treatment method, since there is no need for aeration, the amount of electric power needed is significantly reduced from that of the activated sludge method. Also, the microorganisms can acquire only a small amount of free energy, thereby reducing the amount of sludge generation. However, as a product of anaerobic respiration, there is generated a biogas such as a methane gas, which is flammable and has a peculiar odor.

CITATION LIST

Patent Literature

Patent Document No. 1: Japanese Laid-Open Patent Publication No. 2-71896
Patent Document No. 2: Japanese Laid-Open Patent Publication No. 1-47494

SUMMARY OF INVENTION

Technical Problem

As described above, the activated sludge method has a problem in that the amount of sludge generation is large, and the anaerobic treatment method has a problem in that a biogas is generated.

A non-limiting example embodiment of the present disclosure provides a novel liquid treatment device and liquid treatment unit, with which it is possible to reduce the amount of sludge generation and it is possible to suppress the generation of a biogas.

Solution to Problem

In order to solve the problems set forth above, one aspect of the present invention includes a liquid treatment device including: a structure having a first surface and a second surface, the structure including: a conductor arranged between the first surface and the second surface, the conductor including a first portion exposed to outside at the first surface and a second portion exposed to outside at the second surface, and the conductor electrically connecting the first portion and the second portion; and an ion transfer layer arranged between the first surface and the second surface; and the ion transfer layer allowing hydrogen ions to move therethrough; and a first treatment tank for holding a first liquid to be treated therein, wherein the first surface of the structure is located inside the first treatment tank.

Advantageous Effects of Invention

According to one aspect of the present invention, it is possible to provide a novel liquid treatment device and liquid treatment unit, with which it is possible to reduce the amount of sludge generation and it is possible to suppress the generation of a biogas.

DESCRIPTION OF EMBODIMENTS

The present inventors first worked on a microbial fuel cell as a wastewater treatment method, with which it is possible to reduce the amount of sludge generation and it is possible to suppress the generation of a biogas. A microbial fuel cell is disclosed in Japanese Laid-Open Patent Publication No. 2009-93861, for example.

The configuration and the principle of the microbial fuel cell that the present inventors worked on will be described briefly as a reference example.

Figure 6:
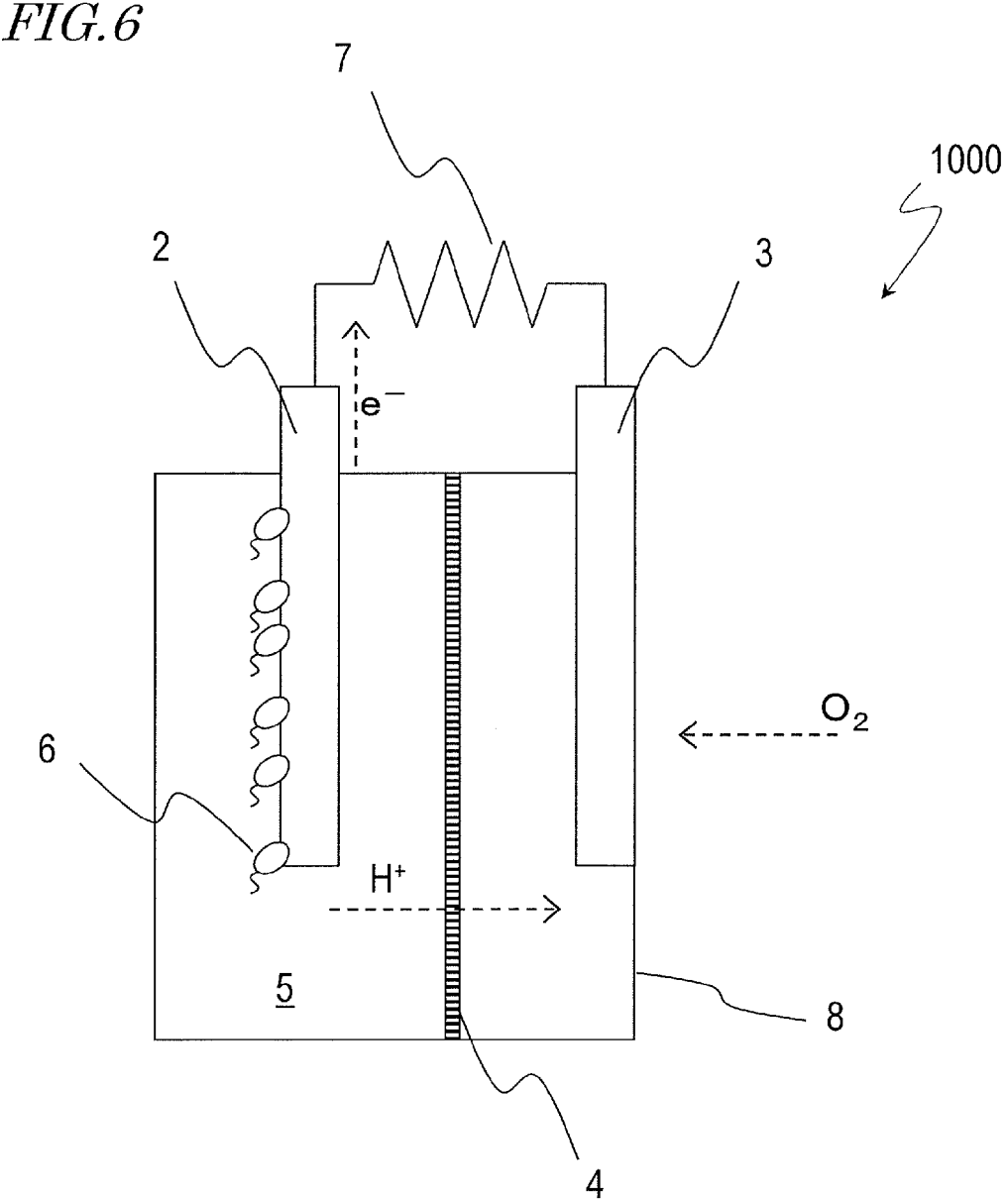
FIG. 6 A conceptual diagram illustrating a configuration of a microbial fuel cell of a reference example.

FIG. 6 is a schematic diagram illustrating the configuration of the microbial fuel cell of the reference example.

A microbial fuel cell 1000 includes, in a container 8, a working electrode (negative electrode) 2, a counter electrode (positive electrode) 3, and an ion-permeable diaphragm 4 arranged between these electrodes 2 and 3. A microorganism 6 is supported on the working electrode 2. The working electrode 2 is electrically connected to the counter electrode 3 via an external circuit 7, thereby forming a closed circuit.

During the operation of the microbial fuel cell 1000, a liquid (or a gas) 5 containing an organic substance, or the like, is supplied to the working electrode 2. An air (or oxygen) is supplied to the counter electrode 3. At the working electrode 2, hydrogen ions ($H^+$) and electrons ($e^-$) are produced from the liquid 5 through the catalytic action of the microorganism 6. The produced hydrogen ions move through the ion-permeable diaphragm 4 to the side of the counter electrode 3, and the electrons move to the side of the counter electrode 3 via the external circuit 7. The hydrogen ions and electrons having moved away from the working electrode 2 are bound to oxygen ($O_2$) at the counter electrode 3 and turn into water ($H_2O$), which is consumed. In this process, the electric energy flowing through the closed circuit is collected.

With the microbial fuel cell 1000 shown in FIG. 6, an electrical wiring for the external circuit 7, and the like, and a voltage booster system (not shown), or the like, for making use of the obtained electric energy, are provided outside the container 8 for treating a waste liquid. In some cases, a collector (collector sheet) is provided in the container 8, in addition to the negative electrode 2 and the positive electrode 3. Thus, the waste liquid treatment using the microbial fuel cell 1000 has a problem in that the configuration of the facility will be complicated.

One embodiment of the present invention, which has been made in view of the circumstances set forth above, provides a novel liquid treatment device, with which it is possible to reduce the amount of sludge generation and it is possible to suppress the generation of a biogas.

One aspect of the present invention is outlined below.

One aspect of the present invention is a liquid treatment device including: a structure having a first surface and a second surface, the structure including: a conductor arranged between the first surface and the second surface, the conductor including a first portion exposed to outside at the first surface and a second portion exposed to outside at the second surface, and the conductor electrically connecting the first portion and the second portion; and an ion transfer layer arranged between the first surface and the second surface; and the ion transfer layer allowing hydrogen ions to move therethrough; and a first treatment tank for holding a first liquid to be treated therein, wherein the first surface of the structure is located inside the first treatment tank.

The first portion of the conductor is for example arranged so as to be in contact with the first liquid to be treated in the first treatment tank, and the second portion of the conductor is for example arranged so as to be in contact with a gas containing oxygen.

For example, the first liquid to be treated contains at least one of an organic matter and ammonia.

For example, the structure supports anaerobic microorganisms on the first surface and supports an oxygen reduction catalyst on the second surface.

The liquid treatment device may further include a second treatment tank for holding a second liquid to be treated therein, wherein the second surface of the structure is located inside the second treatment tank.

The first portion of the conductor for example is arranged so as to be in contact with the first liquid to be treated in the first treatment tank, and the second portion of the conductor is for example arranged so as to be in contact with the second liquid to be treated in the second treatment tank.

The first liquid to be treated for example contains at least one of an organic matter and ammonia; and the second liquid to be treated for example contains nitrogen oxide ions.

For example, the structure supports anaerobic microorganisms on the first surface and the second surface.

The conductor is for example a porous or woven-cloth-like conductor sheet; the ion transfer layer for example includes an ion exchange resin; and the ion exchange resin may be filled in voids in the conductor sheet.

At least a part of the conductor is for example located between a surface of the ion transfer layer that is closer to the first surface and a surface of the ion transfer layer that is closer to the second surface; and a surface of the at least a part of the conductor may be covered with an insulating material.

For example, the conductor includes: a first conductive layer arranged on one side of the ion transfer layer that is closer to the first surface and including the first portion; a second conductive layer arranged on one side of the ion transfer layer that is closer to the second surface and including the second portion; and a connecting portion connecting together the first conductive layer and the second conductive layer, wherein at least a part of the connecting portion may be located between a surface of the ion transfer layer that is closer to the first surface and a surface of the ion transfer layer that is closer to the second surface.

A surface of the at least a part of the connecting portion may be covered with an insulating material.

For example, the first conductive layer is porous or woven-cloth-like.

For example, the second conductive layer is porous or woven-cloth-like.

For example, the connecting portion extends in a direction from the first surface toward the second surface, passing through the ion transfer layer.

For example, the ion transfer layer includes an ion exchange membrane.

The ion transfer layer for example includes an ion exchange resin; the connecting portion for example includes a plurality of conductive particles; and the plurality of conductive particles may be dispersed in the ion exchange resin.

The ion transfer layer for example includes an ion exchange resin; the conductor for example includes: a first conductive layer arranged on one side of the ion transfer layer that is closer to the first surface and including the first portion; and a second conductive layer including a plurality of conductive particles, wherein at least some of the plurality of conductive particles may be dispersed in the ion exchange resin, and some of the plurality of conductive particles may include the second portion.

For example, at least a part of the conductor is formed so as to extend across the ion transfer layer in a thickness direction.

One aspect of the present invention is a liquid treatment unit having a first surface and a second surface, the liquid treatment unit including: a conductor arranged between the first surface and the second surface, the conductor including a first portion exposed to outside at the first surface and a second portion exposed to outside at the second surface, and the conductor electrically connecting the first portion and the second portion; and an ion transfer layer arranged between the first surface and the second surface; and the ion transfer layer allowing hydrogen ions to move therethrough.

The conductor is for example a porous or woven-cloth-like conductor sheet; the ion transfer layer for example includes an ion exchange resin; and the ion exchange resin may be filled in voids in the conductor sheet.

At least a part of the conductor is for example located between a surface of the ion transfer layer that is closer to the first surface and a surface of the ion transfer layer that is closer to the second surface; and a surface of the at least a part of the conductor may be covered with an insulating material.

For example, the conductor includes: a first conductive layer arranged on one side of the ion transfer layer that is closer to the first surface and including the first portion; a second conductive layer arranged on one side of the ion transfer layer that is closer to the second surface and including the second portion; and a connecting portion connecting together the first conductive layer and the second conductive layer, wherein at least a part of the connecting portion may be located between a surface of the ion transfer layer that is closer to the first surface and a surface of the ion transfer layer that is closer to the second surface.

For example, the connecting portion extends in a direction from the first surface toward the second surface, passing through the ion transfer layer.

For example, the ion transfer layer includes an ion exchange membrane.

The ion transfer layer for example includes an ion exchange resin; the connecting portion for example includes a plurality of conductive particles; and the plurality of conductive particles may be dispersed in the ion exchange resin.

The ion transfer layer for example includes an ion exchange resin; the conductor for example includes: a first conductive layer arranged on one side of the ion transfer layer that is closer to the first surface and including the first portion; and a second conductive layer including a plurality of conductive particles, wherein at least some of the plurality of conductive particles may be dispersed in the ion exchange resin, and some of the plurality of conductive particles may include the second portion.

First Embodiment

A liquid treatment device according to a first embodiment of the present invention will now be described with reference to the drawings. In the present specification, "liquid treatment device" generally includes devices for decomposing or removing at least a part of a component contained in a liquid to be treated ("treated liquid"). The "treated liquid" is, for example, a liquid containing an organic matter, a compound containing nitrogen (hereinafter referred to as "nitrogen-containing compound"), or both. The treated liquid may be an electrolyte liquid.

Figure 1:
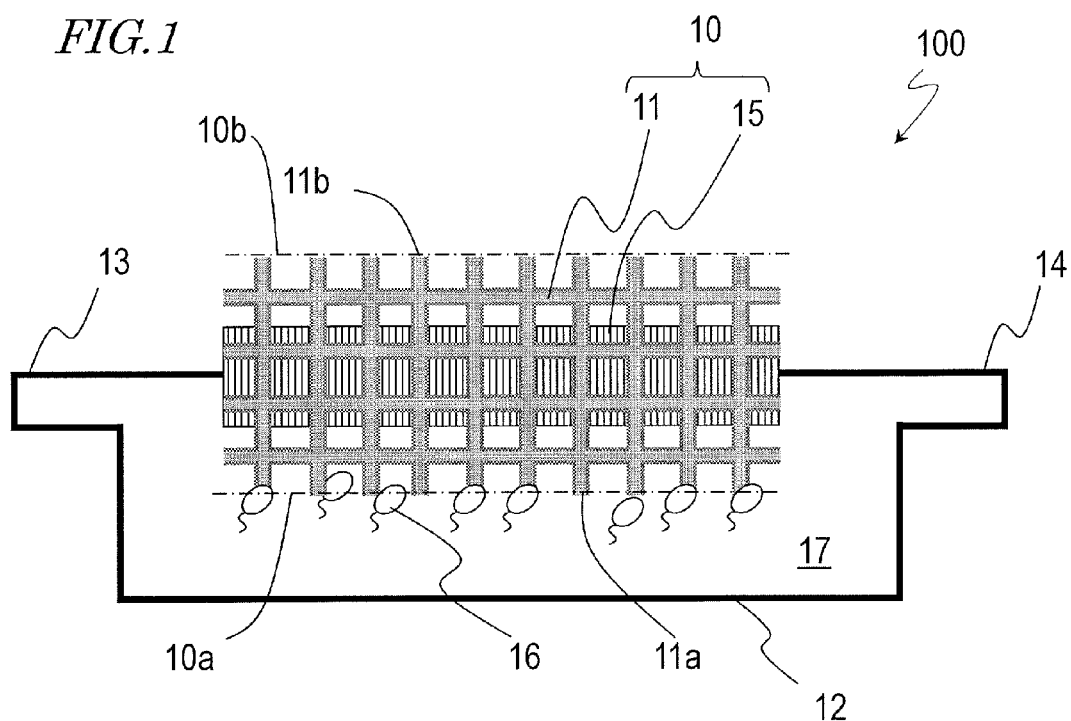
FIG. 1 A conceptual diagram illustrating a liquid treatment device of a first embodiment.

FIG. 1 is a schematic diagram illustrating a liquid treatment device 100 of the first embodiment.

The liquid treatment device 100 includes a structure 10, including a conductor 11 and an ion transfer layer 15, and a treatment tank 12 for holding a treated liquid 17.

The structure 10 has a first surface 10a and a second surface 10b. These surfaces 10a and 10b are surfaces each defining an outer surface of the structure 10, and may each be a virtual surface if the outer surface of the structure 10 is a porous surface, for example. In the present embodiment, the first surface 10a is located on the upstream side with respect to the direction in which hydrogen ions and electrons move inside the structure 10, and the second surface 10b is located on the downstream side. The first surface 10a of the structure 10 is located inside the treatment tank 12. For example, the structure may be in contact with the treated liquid in the treatment tank 12 at the first surface 10a, and in contact with the vapor phase at the second surface 10b. In such a case, the structure 10 may be provided so as to separate between the treated liquid (liquid phase) and the vapor phase.

The conductor 11 is arranged inside the structure 10, i.e., between the first surface 10a of the structure 10 and the second surface 10b. The conductor 11 includes a first portion 11a, which is exposed to the outside at the first surface 10a, and a second portion 11b, which is exposed to the outside at the second surface 10b. The first portion 11a and the second portion 11b are electrically connected together. Term "exposed to the outside" means to be exposed to the outside of the structure 10. Thus, the first and second portions 11a and 11b of the conductor 11 can exchange electrons with the liquid phase or the vapor phase outside the structure 10.

In the example shown in FIG. 1, the first and second portions 11a and 11b are each an end surface of the conductor 11. The first portion 11a is arranged so as to be in contact with the treated liquid 17 in the treatment tank 12, for example. The first portion 11a functions as the anode in the local cell reaction to be described later. The second portion 11b of the conductor 11 is arranged outside the treatment tank 12 so as to be in contact with a gas containing oxygen. The second portion 11b functions as the cathode in the local cell reaction to be described later. Note that the second portion 11b may be exposed to the atmosphere, or may be installed in a chamber configured to receive a supply of oxygen (or a gas containing oxygen).

The ion transfer layer 15 is arranged inside the structure 10, i.e., between the first surface 10a and the second surface 10b. The ion transfer layer 15 may be any layer through which hydrogen ions can move, e.g., an ion exchange resin or an ion exchange membrane.

The treatment tank 12 has a configuration such that the treated liquid 17 can be held therein. The treatment tank 12 may be configured so that the treated liquid 17 flows through the inside of the treatment tank 12. For example, as shown in FIG. 1, the treatment tank 12 may be provided with a liquid inlet 13 for supplying the treated liquid 17 into the treatment tank 12, and a liquid outlet 14 for discharging the treated liquid 17, which has been treated, out of the treatment tank 12. For example, the inside of the treatment tank 12 is kept under an anaerobic condition such that no molecular oxygen exists (or the concentration thereof is very small even if molecular oxygen exists). Thus, the treated liquid 17 can be held in the treatment tank 12 so as not to contact oxygen in the air.

With the liquid treatment device 100 of the present embodiment, a component contained in the treated liquid 17 is oxidatively decomposed by utilizing anaerobic microorganisms 16. Although the anaerobic microorganisms 16 are herein supported on the first portion 11a of the conductor 11, they may be supported on the first surface 10a of the structure 10. Alternatively, they may be floating in the treated liquid 17 in the treatment tank 12.

The liquid treatment device 100 of the present embodiment, having such a configuration, is capable of treating the treated liquid 17 by utilizing a local cell reaction. More specifically, on the side of the first surface 10a of the structure 10, a component contained in the treated liquid 17 is subjected to an oxidation reaction by utilizing the metabolism of the anaerobic microorganisms 16. Hydrogen ions ($H^+$) produced from the oxidation reaction are transferred to the side of the second surface 10b of the structure 10, passing through the ion transfer layer 15. Electrons ($e^-$) produced from the oxidation reaction are transferred to the side of the second surface 10b through the conductor 11. On the other hand, on the side of the second surface 10b of the structure 10, electrons and hydrogen ions, which have been transferred from the side of the first surface 10a, react with oxygen molecules in the air, thereby causing an oxygen reduction reaction. Thus, an oxidation reaction proceeds on the side of the first surface 10a of the structure 10 while an oxygen reduction reaction proceeds on the side of the second surface 10b, thus forming a local cell circuit as a whole.

According to the present embodiment, there is provided a novel treatment device capable of efficiently oxidatively decomposing a component contained in the treated liquid 17 (an organic matter or a nitrogen-containing compound) through an electron transfer reaction. An organic matter or a nitrogen-containing compound contained in the treated liquid 17 is decomposed/removed by the metabolism of anaerobic microorganisms, i.e., by the growth of the microorganisms. Since the oxidative decomposition treatment is performed under an anaerobic condition, the conversion efficiency from organic matters into new microorganism cells can be kept low, as compared with under an aerobic condition. Therefore, the growth of microorganisms, i.e., the amount of sludge generation, can be reduced as compared with a case where the activated sludge method is used. In an ordinary anaerobic treatment, an odorous methane gas is generated, whereas in the oxidative decomposition treatment of the present embodiment, the metabolite is a carbon dioxide ($CO_2$) gas, for example, and it is possible to suppress the generation of the methane gas.

An example of the local cell reaction utilized in the present embodiment will now be described in greater detail.

The treated liquid 17 held in the treatment tank contains a component such as an organic matter or a nitrogen-containing compound, for example. A part of the component of the treated liquid 17 is metabolized by anaerobic microorganisms in the vicinity of the exposed portion (the first portion 11a) of the conductor 11. The metabolism produces electrons while discharging carbon dioxide or hydrogen ions as the metabolite. The produced electrons move from the first portion 11a to the second portion 11b of the conductor 11 through the inside of the conductor 11. Hydrogen ions move to the side of the second surface 10b, passing through the ion transfer layer 15. On the other hand, in the vicinity of the second portion 11b of the conductor 11, oxygen molecules in a gas bind to electrons and hydrogen ions having moved from the treated liquid 17, thereby producing water molecules.

Where the treated liquid 17 contains glucose as an organic matter, the local cell reaction (half cell reaction) described above is expressed as shown in the formula below.

First portion 11a of conductor 11 (anode):

$$C_6H_{12}O_6 + 6H_2O \rightarrow 6CO_2 + 24H^+ + 24e^-$$

Second portion 11b of conductor 11 (cathode):

$$6O_2 + 24H^+ + 24e^- \rightarrow 12H_2O$$

Where the treated liquid 17 contains ammonia as a nitrogen-containing compound, the half cell reaction described above is expressed as shown in the formula below.

First portion 11a of conductor 11 (anode):

$$4NH_3 \rightarrow 2N_2 + 12H^+ + 12e^-$$

Second portion 11b of conductor 11 (cathode):

$$3O_2 + 12H^+ + 12e^- \rightarrow 6H_2O$$

Note that with the microbial fuel cell 1000 illustrated in FIG. 6, it is possible to reduce the amount of sludge generation while it is also possible to suppress the generation of a biogas, but there is a problem in that the configuration thereof is complicated. In contrast, the liquid treatment device 100 of the present embodiment can have a simpler configuration than a microbial fuel cell. For example, with a microbial fuel cell, the anode and the cathode are provided separately, and are connected together by an external circuit. In some cases, the anode is provided with a collector so as to efficiently generate power. In contrast, with the liquid treatment device 100, two electrodes can be formed as an integral member, as the opposite end portions of the conductor 11 are made to function as two electrodes used for the cell reaction. Specifically, the first portion 11a of the conductor 11 can be made to function as the anode, and the second portion 11b as the cathode. The liquid treatment device 100 does not need to be provided with the wiring for an external circuit, and the like, and a collector, a voltage booster system, and the like, which are normally provided on a microbial fuel cell. Thus, it is possible to realize a simpler facility configuration. Moreover, according to the present embodiment, the anode and the cathode are shorted together, and no power generation is performed, and it is therefore possible to further improve the liquid treating efficiency.

In the liquid treatment device 100 of the present embodiment, the structure 10 or the ion transfer layer 15 is arranged so that the treated liquid (liquid phase) 17 held inside the treatment tank 12 and the vapor phase containing oxygen are separated from each other, for example. Term "separation" herein means physically blocking the elements from each other. Thus, it is possible to suppress the movement of an organic matter or a nitrogen-containing compound in the treated liquid 17 to the vapor phase side, and to suppress the movement of the oxygen molecules on the vapor phase side into the treated liquid 17. Thus, the inside of the treatment tank 12 can be kept under an anaerobic condition where no molecular oxygen exists. As a result, the growth of aerobic microorganisms is suppressed in the treatment tank 12 and in the vapor phase, and the liquid treatment can be performed more reliably under an anaerobic condition.

There is no particular limitation on the configuration of the conductor 11. The conductor 11 may be provided so as to extend entirely across the thickness of the structure 10 (the thickness along the direction of movement of hydrogen ions). For example, it may continuously extend from the first surface 10a of the structure 10 toward the second surface 10b. Alternatively, the conductor 11 may be formed by a plurality of conductive portions that are electrically connected together. For example, a plurality of conductive layers electrically connected together may be provided, as will be described later. Higher treatment efficiencies are achieved if the resistance between the first portion 11a and the second portion 11b of the conductor 11 is kept small (e.g., the first portion 11a and the second portion 11b are shorted together). Moreover, at least a part of the conductor 11 may be formed so as to extend across the ion transfer layer in a thickness direction of. The material of the conductor 11 may be, for example, a conductive metal such as aluminum, copper, stainless steel, nickel or titanium, and a carbon material such as carbon paper or carbon felt.

In the structure 10 of the present embodiment, the conductor 11 may have a space (voids) extending continuous in the thickness direction. For example, it may be a conductor sheet having voids therein, such as a porous or woven-cloth-like conductor sheet. Alternatively, it may be a metal plate having a plurality of through holes running in the thickness direction. The ion transfer layer 15 may include an ion exchange resin, for example, and the ion exchange resin may be filled in the space (voids) in the conductor 11. This suppresses the contact of the treated liquid and microorganisms with oxygen in the gas. Therefore, since excessive growth of microorganisms is suppressed, it is possible to reduce the amount of sludge generation. The ion exchange resin may be, for example, filled in the vicinity of the gas-liquid interface formed inside the structure 10. The ion exchange resin may be, for example, Nafion from DuPont, or Flemion or Selemion from Asahi Glass Co., Ltd.

At least a part of the conductor 11 is located inside the ion transfer layer 15, i.e., between a surface of the ion transfer layer 15 that is on the side of the first surface 10a and a surface of the ion transfer layer 15 that is on the side of the second surface 10b. Then, a part of the surface of the conductor 11 that is located between the surface on the side of the first surface 10a and the surface on the side of the second surface 10b may be covered with an insulating material. Thus, it is possible to more reliably suppress the contact between electrons passing through the conductor 11 and hydrogen ions passing through the ion transfer layer 15. Therefore, it is possible to suppress the movement of electrons and hydrogen ions from the side of the first surface 10a of the structure 10 to the side of the second surface 10b, and to efficiently guide the electrons and hydrogen ions to the side of the second surface 10b. Note that a part of the surface of the conductor 11, other than the portions 11a and 11b exposed to the outside, may be entirely covered with an insulating material. There is no particular limitation on the insulating material, but it may be a natural rubber, a synthetic resin, a glass fiber, or the like, for example.

The oxidation reaction of a component contained in the treated liquid 17 on the side of the first surface 10a of the structure 10 may be performed using a catalyst material. In such a case, the oxidation catalyst may be supported on the first surface 1a of the structure 10.

An oxygen reduction catalyst may be supported on the second surface 10b of the structure 10. Thus, it is possible to increase the oxygen reduction reaction efficiency, and it is therefore possible to realize a more efficient liquid treatment. The oxygen reduction catalyst may be platinum. Alternatively, the oxygen reduction catalyst may include carbon particles doped with at least one non-metal atom and a metal atom. There is no particular limitation on the atom with which carbon particles are doped. The non-metal atom may be, for example, nitrogen atom, boron atom, sulfur atom, phosphorus atom, or the like. The metal atom may be, for example, iron atom, copper atom, or the like.

The first surface 10a of the structure 10 may be modified with electron transfer mediator molecules, for example. Alternatively, the treated liquid in the treatment tank 12 may contain electron transfer mediator molecules. Then, it is possible to increase the electron transfer efficiency from microorganisms to the conductor, and to realize a more efficient liquid treatment. Advantageous effects of mediator molecules will now be described in greater detail.

The metabolic mechanism using anaerobic microorganisms is such that electrons are exchanged inside cells or with the terminal electron acceptor. As mediator molecules are introduced into the treated liquid 17, the mediator molecules serve as the terminal electron acceptors for metabolism, and the mediator molecules pass the electrons received onto the conductor 11. As a result, it is possible to increase the oxidative decomposition rate of an organic matter, and the like, in the treated liquid 17. Similar effects are realized also when mediator molecules are supported on the first surface 10a of the structure 10 (or the first portion 11a of the conductor 11). There is no particular limitation on the mediator molecule, but it may be neutral red, anthraquinone-2,6-disulfonate (AQDS), thionin, potassium ferricyanide, or methyl viologen.

Second Embodiment

A liquid treatment device according to a second embodiment of the present invention will now be described with reference to the drawings.

Figure 2:
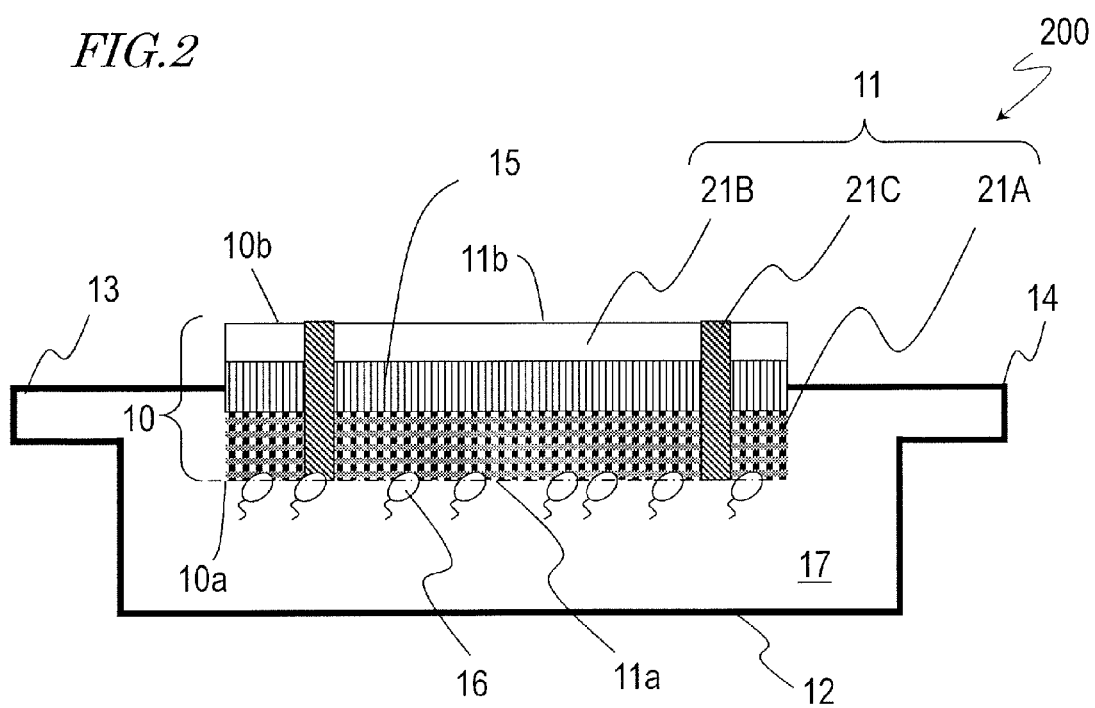
FIG. 2 A conceptual diagram illustrating a liquid treatment device of a second embodiment.

FIG. 2 is a schematic diagram illustrating a liquid treatment device 200 of the second embodiment. In FIG. 2, like elements to those of the liquid treatment device 100 shown in FIG. 1 are denoted by like reference numerals and will not be described below.

The liquid treatment device 200 includes a structure 10, including a conductor 11 and an ion transfer layer 15, and a treatment tank 12 for holding a treated liquid 17.

The conductor 11 includes a first conductive layer 21A, a second conductive layer 21B, and a connecting portion 21C. The first conductive layer 21A is arranged on one side of the ion transfer layer 15 that is closer to the first surface 10a, and functions as the anode in the local cell reaction. The first conductive layer 21A includes the first portion 11a exposed to the outside at the first surface 10a of the structure 10. The second conductive layer 21B is arranged on one side of the ion transfer layer 15 that is closer to the second surface 10b, and functions as the cathode in the local cell reaction. The second conductive layer 21B includes the second portion 11b exposed to the outside at the second surface 10b of the structure 10. The connecting portion 21C electrically connect together the first conductive layer 21A and the second conductive layer 21B. At least a part of the connecting portion 21C is located inside the ion transfer layer 15, i.e., between the surface of the ion transfer layer 15 on the side of the first surface 10a and the surface of the ion transfer layer 15 on the side of the second surface 10b. For example, it may be formed so as to extend across the ion transfer layer 15 in the thickness direction as shown in the figure.

In the present embodiment, a component contained in the treated liquid 17 is oxidatively decomposed by the anaerobic microorganisms 16 at the first portion 11a of the first conductive layer 21A. The produced hydrogen ions are transferred to the second portion 11b of the second conductive layer 21B through the ion transfer layer 15. Electrons produced from the oxidative decomposition are transferred from the first conductive layer 21A to the second conductive layer 21B through the connecting portion 21C. At the second conductive layer 21B, oxygen molecules in a gas react with the hydrogen ions and electrons having been transferred, thereby causing an oxygen reduction reaction.

The liquid treatment device 200 of the present embodiment, having such a configuration, is capable of oxidatively decomposing a component contained in the treated liquid 17 under an anaerobic condition by utilizing the local cell reaction, as in the first embodiment. Therefore, according to the present embodiment, it is possible to realize a novel liquid treatment, with which it is possible to reduce the amount of sludge generation and it is possible to suppress the generation of a biogas.

In the example shown in FIG. 2, the first surface 10a of the structure 10 is defined by the surface of the first conductive layer 21A, and the entire surface of the first conductive layer 21A is in contact with the outside (herein, the treated liquid 17). Note that only at least a part of the surface of the first conductive layer 21A needs to be in contact with the treated liquid 17. Similarly, the second surface 10b of the structure 10 is defined by the surface of the second conductive layer 21B, and the surface of the second conductive layer 21B is in contact with the outside (herein, a gas containing oxygen). Only at least a part of the surface of the second conductive layer 21B needs to be in contact with the gas.

The first conductive layer 21A may have a space (voids) extending continuous in the thickness direction. For example, it may be porous or woven-cloth-like with a plurality of voids therein. The plurality of voids may be filled with the treated liquid 17. Thus, hydrogen ions produced from the oxidative decomposition reaction in the vicinity of the surface of the first conductive layer 21A can reach the ion transfer layer 15 through the voids of the first conductive layer 21A, and can further move to the side of the second surface 10b through the ion transfer layer 15.

There is no particular limitation on the material of the first conductive layer 21A. The material of the first conductive layer 21A may be, for example, a conductive metal such as aluminum, copper, stainless steel, nickel or titanium, and a carbon material such as carbon paper or carbon felt.

The second conductive layer 21B may have a space (voids) extending continuous in the thickness direction. For example, it may be porous or woven-cloth-like with a plurality of voids therein. Then, hydrogen ions having moved to the side of the second surface 10b through the ion transfer layer 15 can be made to more reliably react with oxygen in the gas. There is no particular limitation on the material of the second conductive layer 21B, but it may be, for example, a conductive metal such as aluminum, copper, stainless steel, nickel or titanium, and a carbon material such as carbon paper or carbon felt.

There is no particular limitation on the shape of the connecting portion 21C as long as the connecting portion 21C is configured so as to electrically connect between the first conductive layer 21A and the second conductive layer 21B. As shown in the figure, the connecting portion 21C may extend in a direction from the first surface 10a toward the second surface 10b, passing through the inside of the ion transfer layer 15. Although the connecting portion 21C is in contact with the outside (the liquid phase and the vapor phase) at the first and second surfaces 10a and 10b in this example, the connecting portion 21C may be not in contact with the outside. There is no particular limitation on the material of the connecting portion 21C. The material of the connecting portion 21C may be, for example, a conductive metal such as aluminum, copper, stainless steel, nickel or titanium.

A part of the connecting portion 21C that is located inside the ion transfer layer 15 may be covered with an insulating material. Then, it is possible to suppress the reaction between electrons and hydrogen ions while moving from the first surface 10a to the side of the second surface 10b, and it is possible to efficiently move the electrons and hydrogen ions to the side of the second surface 10b. Note that the connecting portion 21C may be entirely covered with an insulating material, except for portions thereof that are exposed to the outside and portions thereof that are in contact with the first and second conductive layers 21A and 21B. There is no particular limitation on the insulating material, but it may be, for example, a natural rubber, a synthetic resin, or a glass fiber.

The ion transfer layer 15 includes an ion exchange membrane, for example. Using an ion exchange membrane, it is possible to more efficiently move hydrogen ions. Note that the ion transfer layer 15 may be formed by using a silicone rubber or Gore-Tex from W. L. Gore & Associates. Alternatively, the ion transfer layer 15 may be an ion exchange resin layer that is filled in the voids in the first conductive layer 21A.

Also in the present embodiment, as in the first embodiment, the oxidation reaction of a component contained in the treated liquid 17 may be performed by utilizing a catalyst material instead of anaerobic microorganisms. In such a case, the catalyst material may be supported on the first surface 10a of the structure 10. The second surface 10b of the structure 10 may be supporting an oxygen reduction catalyst. The first surface 10a of the structure may be modified with electron transfer mediator molecules. Alternatively, electron transfer mediator molecules may exist in the treatment tank 12.

Embodiment 3

A liquid treatment device according to a third embodiment of the present invention will now be described with reference to the drawings.

Figure 3:
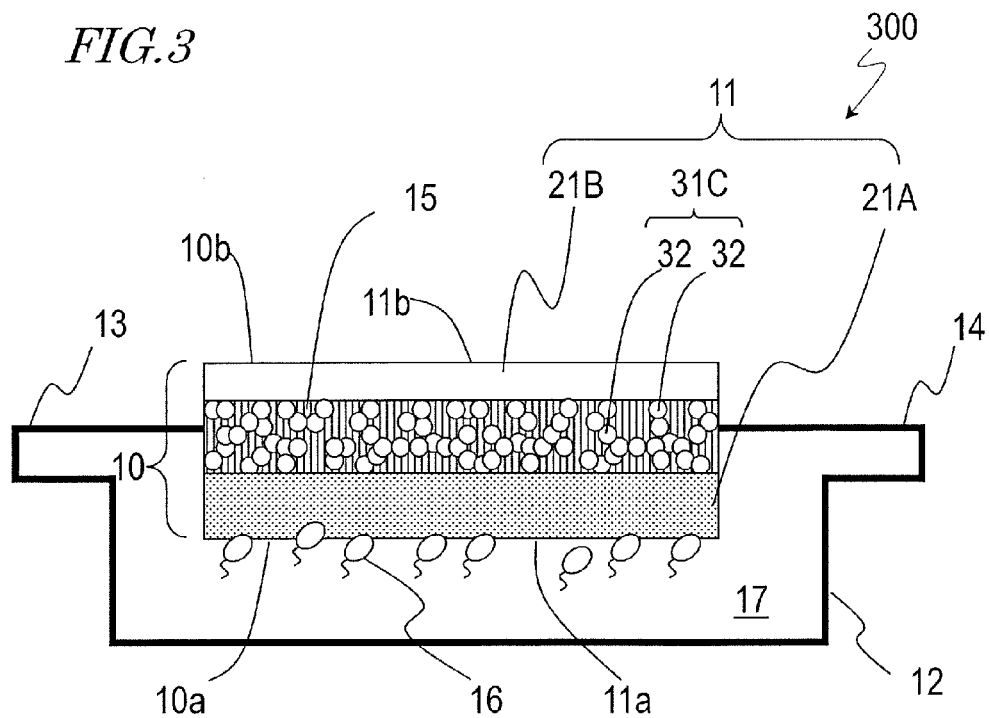
FIG. 3 A conceptual diagram illustrating a liquid treatment device of a third embodiment.

FIG. 3 is a schematic diagram illustrating a liquid treatment device 300 of the third embodiment. In FIG. 3, like elements to those of the liquid treatment device 200 shown in FIG. 2 are denoted by like reference numerals and will not be described below.

The liquid treatment device 300 includes a structure 10, including a conductor 11 and an ion transfer layer 15, and a treatment tank 12 for holding a treated liquid 17.

The conductor 11 includes a first conductive layer 21A, a second conductive layer 21B, and a connecting portion 31C. The connecting portion 31C electrically connect together the first conductive layer 21A and the second conductive layer 21B. The connecting portion 31C is a plurality of conductive particles 32. The plurality of conductive particles 32 exist dispersed inside the ion transfer layer 15 so as to electrically connect together the first conductive layer 21A and the second conductive layer 21B.

In the present embodiment, a component contained in the treated liquid 17 is oxidatively decomposed by the anaerobic microorganisms 16 at the first portion 11a of the first conductive layer 21A. The produced hydrogen ions are transferred to the second portion 11b of the second conductive layer 21B through the ion transfer layer 15. Electrons produced from the oxidative decomposition are transferred from the first conductive layer 21A to the second conductive layer 21B through the connecting portion 31C. At the second conductive layer 21B, oxygen molecules in a gas react with the hydrogen ions and electrons having been transferred, thereby causing an oxygen reduction reaction.

The liquid treatment device 300 of the present embodiment, having such a configuration, is capable of oxidatively decomposing a component contained in the treated liquid 17 under an anaerobic condition by utilizing the local cell reaction, as in the first and second embodiments. Therefore, according to the present embodiment, it is possible to realize a novel liquid treatment, with which it is possible to reduce the amount of sludge generation and it is possible to suppress the generation of a biogas. There is no need to provide wiring for an external circuit for routing electricity to the outside, and the like, and a collector, a voltage booster system, and the like, and it is therefore possible to realize a simpler facility configuration.

There is no particular limitation on the material of the plurality of conductive particles 32 to be the connecting portion 31C. The material of the conductive particles 32 may be, for example, a conductive metal such as aluminum, copper, stainless steel, nickel or titanium. Also, it may be a carbon material such as graphite, graphene or fullerene.

The ion transfer layer 15 includes an ion exchange resin, for example. Using an ion exchange resin, it is possible to effectively more hydrogen ions, and the plurality of conductive particles 32 can be supported while being dispersed in the resin. Note that the ion transfer layer 15 may be formed by using a silicone resin.

In the present embodiment, as in the first and second embodiments, the oxidation reaction of a component contained in the treated liquid 17 may be performed by utilizing a catalyst material instead of anaerobic microorganisms. In such a case, the catalyst material may be supported on the first surface 10a of the structure 10. The second surface 10b of the structure 10 may be supporting an oxygen reduction catalyst. The first surface 10a of the structure 10 may be modified with electron transfer mediator molecules. Alternatively, electron transfer mediator molecules may exist in the treatment tank 12.

Embodiment 4

A liquid treatment device according to a fourth embodiment of the present invention will now be described with reference to the drawings.

Figure 4:
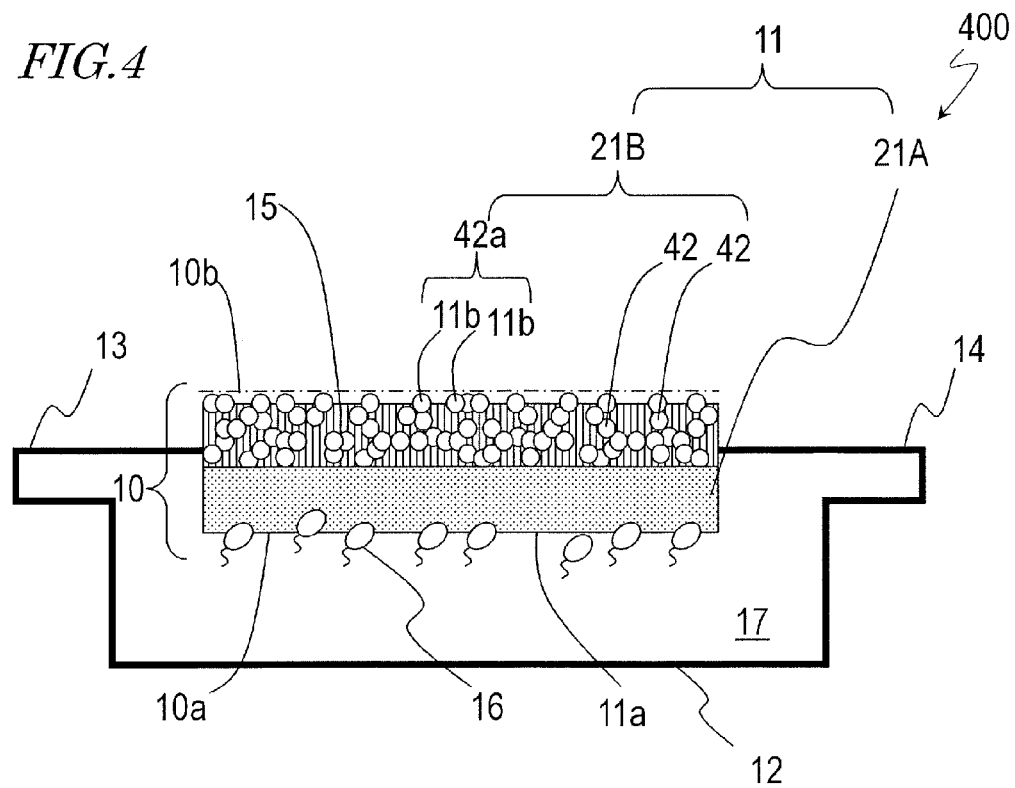
FIG. 4 A conceptual diagram illustrating a liquid treatment device of a fourth embodiment.

FIG. 4 is a schematic diagram illustrating a liquid treatment device 400 of the fourth embodiment. In FIG. 4, like elements to those of the liquid treatment device 300 shown in FIG. 3 are denoted by like reference numerals and will not be described below.

The liquid treatment device 400 includes a structure 10, including a conductor 11 and an ion transfer layer 15, and a treatment tank 12 for holding a treated liquid 17.

The conductor 11 includes a first conductive layer 21A and a second conductive layer 21B. The first conductive layer 21A is arranged on one side of the ion transfer layer 15 that is closer to a first surface 10a, and functions as the anode in the local cell reaction. The first conductive layer 21A includes the first portion 11a exposed to the outside at the first surface 10a of the structure 10. The second conductive layer 21B includes a plurality of conductive particles 42. At least some of the plurality of conductive particles 42 exist dispersed inside the ion transfer layer 15. Some conductive particles 42a of the plurality of conductive particles 42 include second portions 11b exposed to the outside at a second surface 10b of the structure 10, and function as the cathode in the local cell reaction. The plurality of conductive particles 42 exist so as to electrically connect together the first conductive layer 21A and the conductive particles 42a including the second portions 11b.

In the present embodiment, a component contained in the treated liquid 17 is oxidatively decomposed by the anaerobic microorganisms 16 at the first portion 11a of the first conductive layer 21A. The produced hydrogen ions are transferred to the second portions 11b of the conductive particles 42a through the ion transfer layer 15. Electrons produced from the oxidative decomposition are transferred from the first conductive layer 21A to the second portions 11b of the conductive particles 42a through the plurality of conductive particles 42. At the second portions 11b of the conductive particles 42a, oxygen molecules in a gas react with the hydrogen ions and electrons having been transferred, thereby causing an oxygen reduction reaction.

The liquid treatment device 400 of the present embodiment, having such a configuration, is capable of oxidatively decomposing a component contained in the treated liquid 17 under an anaerobic condition by utilizing the local cell reaction, as in the first to third embodiments. Therefore, according to the present embodiment, it is possible to realize a novel liquid treatment, with which it is possible to reduce the amount of sludge generation and it is possible to suppress the generation of a biogas. There is no need to provide wiring for an external circuit for routing electricity to the outside, and the like, and a collector, a voltage booster system, and the like, and it is therefore possible to realize a simpler facility configuration.

There is no particular limitation on the material of the plurality of conductive particles 32 to be the connecting portion 42. The material of the conductive particles 42 may be, for example, a conductive metal such as aluminum, copper, stainless steel, nickel or titanium. Also, it may be a carbon material such as graphite, graphene or fullerene.

The ion transfer layer 15 includes an ion exchange resin, for example. Using an ion exchange resin, it is possible to effectively more hydrogen ions, and the plurality of conductive particles 42 can be supported while being dispersed in the resin. Note that the ion transfer layer 15 may be formed by using a silicone resin.

In the present embodiment, the conductive particles 42 may function as an oxygen reduction catalyst. As in the first to third embodiments, the oxidation reaction of a component contained in the treated liquid 17 may be performed by utilizing a catalyst material instead of anaerobic microorganisms. In such a case, the catalyst material may be supported on the first surface 10a of the structure 10. The second surface 10b of the structure 10 may be supporting an oxygen reduction catalyst. The first surface 10a of the structure 10 may be modified with electron transfer mediator molecules. Alternatively, electron transfer mediator molecules may exist in the treatment tank 12.

Embodiment 5

A liquid treatment device according to a fifth embodiment of the present invention will now be described with reference to the drawings.

Figure 5:
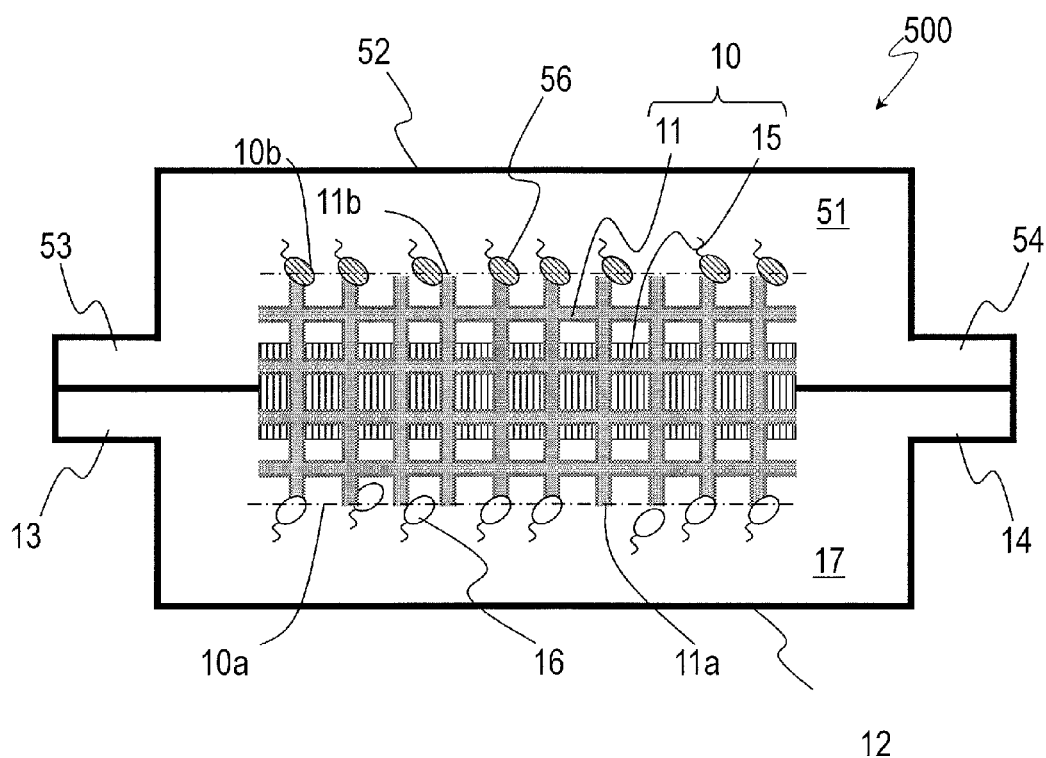
FIG. 5 A conceptual diagram illustrating a liquid treatment device of a fifth embodiment.

FIG. 5 is a schematic diagram illustrating a liquid treatment device 500 of the fifth embodiment. In FIG. 5, like elements to those of the liquid treatment device 100 shown in FIG. 1 are denoted by like reference numerals and will not be described below.

The liquid treatment device 500 includes a structure 10, including a conductor 11 and an ion transfer layer 15, a first treatment tank 12 for holding a first treated liquid 17, and a second treatment tank 52 for holding a second treated liquid 51.

The first surface 10a of the structure 10 is located inside the first treatment tank 12. The second surface 10b of the structure 10 is located inside the second treatment tank 52. For example, the structure 10 may be in contact with the first treated liquid 17 in the first treatment tank 12 at the first surface 10a, and in contact with the second treated liquid 51 in the second treatment tank 52 at the second surface 10b. In such a case, the structure 10 may be provided so as to separate between the first treated liquid 17 and the second treated liquid 51.

The first portion 11a is arranged so as to be in contact with the first treated liquid 17 in the first treatment tank 12, for example. The first portion 11a functions as the anode in the local cell reaction to be described later. The second portion 11b of the conductor is arranged so as to be in contact with the second treated liquid 51 in the second treatment tank 52, for example. The second portion 11b functions as the cathode in the local cell reaction to be described later.

The first treatment tank 12 has a configuration such that the first treated liquid 17 can be held therein. The second treatment tank 52 has a configuration such that the second treated liquid 51 can be held therein. The first treatment tank 12 and the second treatment tank 52 may each be configured so that the treated liquid flows through the inside of the treatment tank. For example, as shown in FIG. 5, the first treatment tank 12 may be provided with a liquid inlet 13 for supplying the first treated liquid 17 into the first treatment tank 12, and a liquid outlet 14 for discharging the treated liquid 17, which has been treated, out of the treatment tank 12. The second treatment tank 52 may be provided with a liquid inlet 53 for supplying the second treated liquid 51 into the second treatment tank 52, and a liquid outlet 54 for discharging the treated liquid 51, which has been treated, out of the second treatment tank 52. For example, the inside of the first treatment tank 12 and the second treatment tank 52 is kept under an anaerobic condition such that no molecular oxygen exists (or the concentration thereof very small even if molecular oxygen exists). Thus, the first treated liquid 17 and the second treated liquid 51 can be held in the treatment tanks so as not to contact oxygen in the air.

With the liquid treatment device 500 of the present embodiment, a component contained in the first treated liquid 17 is oxidatively decomposed by utilizing anaerobic microorganisms 16. A component contained in the second treated liquid 51 is reduced by utilizing anaerobic microorganisms 56. Although the anaerobic microorganisms 16 are herein supported on the first portion 11a of the conductor 11, they may be supported on the first surface 10a of the structure 10. Alternatively, they may be floating in the first treated liquid 17 in the first treatment tank 12. Similarly, although the anaerobic microorganisms 56 are supported on the second portion 11b of the conductor 11, they may be supported on the second surface 10b of the structure 10. Alternatively, they may be floating in the second treated liquid 51 in the second treatment tank 52.

The liquid treatment device 500 of the present embodiment, having such a configuration, is capable of treating the first treated liquid 17 and the second treated liquid 51 by utilizing the local cell reaction. More specifically, on the side of the first surface 10a of the structure 10, a component contained in the first treated liquid 17 is oxidized by utilizing the metabolism of the anaerobic microorganisms 16. Hydrogen ions ($H^+$) produced from the oxidation reaction are transferred to the side of the second surface 10b of the structure 10, passing through the ion transfer layer 15. Electrons ($e^-$) produced from the oxidation reaction are transferred to the side of the second surface 10b through the conductor 11. On the other hand, on the side of the second surface 10b of the structure 10, electrons and hydrogen ions, which have been transferred from the side of the first surface 10a, react with a component contained in the second treated liquid 51, thereby causing a reduction reaction. Thus, an oxidation reaction proceeds on the side of the first surface 10a of the structure 10 while a reduction reaction proceeds on the side of the second surface 10b, thus forming a local cell circuit as a whole.

According to the present embodiment, there is provided a novel treatment device capable of efficiently oxidatively decomposing a component contained in the first treated liquid 17 (an organic matter or an nitrogen-containing compound) and efficiently reducing a component contained in the second treated liquid 51 through an electron transfer reaction. An organic matter or a nitrogen-containing compound contained in the first treated liquid 17 is decomposed/removed by the metabolism of anaerobic microorganisms, i.e., by the growth of the microorganisms. Since the oxidative decomposition treatment is performed under an anaerobic condition, the conversion efficiency from organic matters into new microorganism cells can be kept low, as compared with under an aerobic condition. Therefore, the growth of microorganisms, i.e., the amount of sludge generation, can be reduced as compared with a case where the activated sludge method is used. In an ordinary anaerobic treatment, an odorous methane gas is generated, whereas in the oxidative decomposition treatment of the present embodiment, the metabolite is a carbon dioxide ($CO_2$) gas, for example, and it is possible to suppress the generation of the methane gas.

An example of the local cell reaction utilized in the present embodiment will now be described in greater detail.

The treated liquid 17 held in the first treatment tank 12 contains a component such as an organic matter or a nitrogen-containing compound, for example. A part of the component of the first treated liquid 17 is metabolized by anaerobic microorganisms in the vicinity of the exposed portion (the first portion 11a) of the conductor 11. The metabolism produces electrons while discharging carbon dioxide or hydrogen ions as the metabolite. The produced electrons move from the first portion 11a to the second portion 11b of the conductor 11 through the inside of the conductor 11. Hydrogen ions move to the side of the second surface 10b, passing through the ion transfer layer 15. On the other hand, in the vicinity of the second portion 11b of the conductor 11, a component of the second treated liquid 51, e.g., nitrogen oxide ions such as nitrate ions or nitrite ions, binds to electrons and hydrogen ions having moved from the first treated liquid 17 and is reduced, thereby producing water molecules.

Where the first treated liquid 17 contains glucose as an organic matter and the second treated liquid 51 contains nitric acid, the half cell reaction described above is expressed as shown in the formula below.

First portion 11a of conductor 11 (anode):

$$5C_6H_{12}O_6 + 30H_2O \rightarrow 30CO_2 + 120H^+ + 120e^-$$

Second portion 11b of conductor 11 (cathode):

$$24HNO_3 + 120H^+ + 120e^- \rightarrow 12N_2 + 72H_2O$$

Where the first treated liquid 17 contains ammonia as a nitrogen-containing compound and the second treated liquid 51 contains nitric acid, the half cell reaction described above is expressed as shown in the formula below.

First portion 11a of conductor 11 (anode):

$$10NH_3 \rightarrow 5N_2 + 30H^+ + 30e^-$$

Second portion 11b of conductor 11 (cathode):

$$6HNO_3 + 30H^+ + 30e^- \rightarrow 3N_2 + 18H_2O$$

There is no particular limitation on the configuration of the structure 10. While FIG. 5 shows an example where the structure 10 of Embodiment 1 is used, the present embodiment can be implemented also by using the structure 10 of Embodiment 2 or 3.

In the present embodiment, the oxidative decomposition of a component contained in the first treated liquid 17 and the reduction of a component contained in the second treated liquid 51 can be performed by utilizing a catalyst material instead of anaerobic microorganisms. In such a case, the catalyst material may be supported on the first surface 10a and the second surface 10b of the structure 10. The first surface 10a of the structure 10 may be modified with electron transfer mediator molecules. Alternatively, electron transfer mediator molecules may exist in the treatment tank 12.

In the present specification, the structure 10 of the first to fifth embodiments described above may also be referred to as a "liquid treatment unit". A liquid treatment unit may be an assembly having a conductor 11 and an ion transfer layer 15, and may not have microorganisms, an oxidation-reduction catalyst, mediator molecules, or the like. By installing a liquid treatment unit in a treatment tank, there is provided a liquid treatment facility having a simple configuration.

INDUSTRIAL APPLICABILITY

In one aspect, the present invention is widely applicable to treatment of a liquid containing an organic matter or a nitrogen-containing compound, e.g., a drainage from plants, or the like, of various industries, and an organic wastewater such as a sewage sludge. The present invention is also applicable to improving the environment of a body of water.

REFERENCE SIGNS LIST 2 working electrode
3 counter electrode
4 ion-permeable diaphragm
5 liquid
6 microorganism
7 external circuit
8 container
10 structure (liquid treatment unit)
10a, 10b surface of structure
11 conductor
11a, 11b portion of conductor
21A, 21B conductive layer
21C, 31C connecting portion
12, 52 treatment tank
13, 53 liquid inlet
14, 54 liquid outlet
15 ion transfer layer
16, 56 anaerobic microorganisms
17, 51 treated liquid
32, 42, 42a conductive particles
1000 microbial fuel cell
100, 200, 300, 400, 500 liquid treatment device

The invention claimed is:

1. A liquid treatment unit having a first surface and a second surface, the liquid treatment unit comprising:
an ion transfer layer arranged between the first surface and the second surface, the ion transfer layer allowing hydrogen ions to move therethrough; and
a conductor arranged between the first surface and the second surface, the conductor including a first portion exposed to outside at the first surface and a second portion exposed to outside at the second surface, at least a part of the conductor being located inside the ion transfer layer, and the conductor electrically connecting the first portion and the second portion.

2. The liquid treatment unit according to claim 1, wherein:
the conductor is a porous or woven-cloth-like conductor sheet;
the ion transfer layer includes an ion exchange resin; and
the ion exchange resin is filled in voids in the conductor sheet.

3. The liquid treatment unit according to claim 2, wherein:
at least a part of the conductor is located between a surface of the ion transfer layer that is closer to the first surface and a surface of the ion transfer layer that is closer to the second surface; and
a surface of the at least a part of the conductor is covered with an insulating material.

4. The liquid treatment unit according to claim 1, the conductor including:
a first conductive layer arranged on one side of the ion transfer layer that is closer to the first surface and including the first portion;
a second conductive layer arranged on one side of the ion transfer layer that is closer to the second surface and including the second portion; and
a connecting portion connecting together the first conductive layer and the second conductive layer,
wherein at least a part of the connecting portion is located between a surface of the ion transfer layer that is closer to the first surface and a surface of the ion transfer layer that is closer to the second surface.

5. The liquid treatment unit according to claim 4, wherein the connecting portion extends in a direction from the first surface toward the second surface, passing through the ion transfer layer.

6. The liquid treatment unit according to claim 5, wherein the ion transfer layer includes an ion exchange membrane.

7. The liquid treatment unit according to claim 4, wherein:
the ion transfer layer includes an ion exchange resin;
the connecting portion includes a plurality of conductive particles; and
the plurality of conductive particles are dispersed in the ion exchange resin.

8. The liquid treatment unit according to claim 1, wherein:
the ion transfer layer includes an ion exchange resin;
the conductor includes:
a first conductive layer arranged on one side of the ion transfer layer that is closer to the first surface and including the first portion; and
a second conductive layer including a plurality of conductive particles,
wherein at least some of the plurality of conductive particles are dispersed in the ion exchange resin, and some of the plurality of conductive particles include the second portion.

9. The liquid treatment unit according to claim 4, wherein a surface of the at least a part of the connecting portion is covered with an insulating material.

10. The liquid treatment unit according to claim 4, wherein the first conductive layer is porous or woven-cloth-like.

11. The liquid treatment unit according to claim 4, wherein the second conductive layer is porous or woven-cloth-like.

12. The liquid treatment unit according to claim 1, wherein at least a part of the conductor extends across the ion transfer layer in a thickness direction.

13. A liquid treatment device comprising:
the liquid treatment unit of claim 1,
and
a first treatment tank for holding a first liquid to be treated therein,
wherein the first surface of the structure is located inside the first treatment tank.

14. The liquid treatment device according to claim 13, wherein the first portion of the conductor is arranged so as to be in contact with the first liquid to be treated in the first treatment tank, and the second portion of the conductor is arranged so as to be in contact with a gas containing oxygen.

15. The liquid treatment device according to claim 14, wherein the first liquid to be treated contains at least one of an organic matter and ammonia.

16. The liquid treatment device according to claim 13, wherein the structure supports anaerobic microorganisms on the first surface and supports an oxygen reduction catalyst on the second surface.

17. The liquid treatment device according to claim 13, further comprising a second treatment tank for holding a second liquid to be treated therein,
wherein the second surface of the structure is located inside the second treatment tank.

18. The liquid treatment device according to claim 17, wherein the first portion of the conductor is arranged so as to be in contact with the first liquid to be treated in the first treatment tank, and the second portion of the conductor is arranged so as to be in contact with the second liquid to be treated in the second treatment tank.

19. The liquid treatment device according to claim 17, wherein:
the first liquid to be treated contains at least one of an organic matter and ammonia; and
the second liquid to be treated contains nitrogen oxide ions.

20. The liquid treatment device according to claim 17, wherein the structure supports anaerobic microorganisms on the first surface and the second surface.

* * * * *